Figure 1:
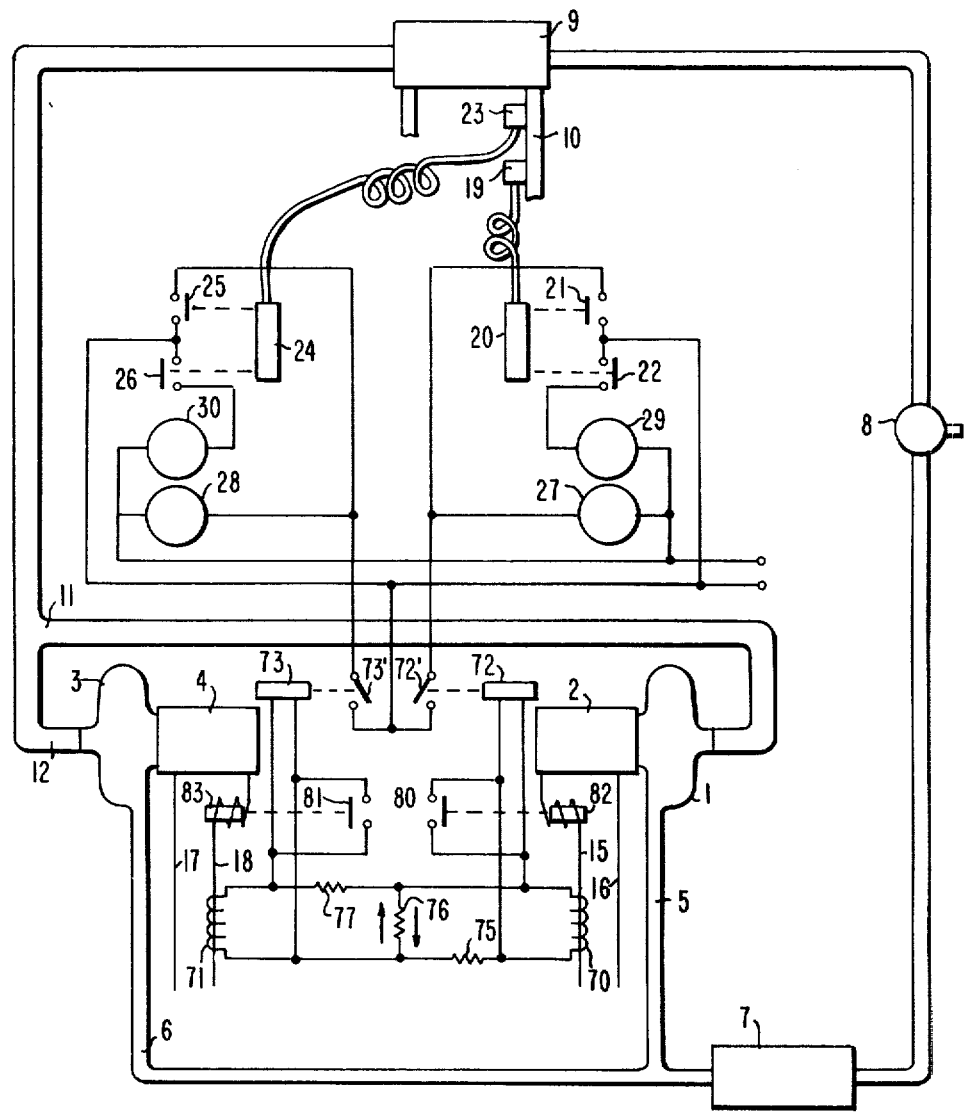

United States Patent [19]

Watson et al.

[11] 4,248,054
[45] Feb. 3, 1981

[54] REFRIGERATION SYSTEM WITH LOAD BALANCING CONTROL FOR AT LEAST THREE CENTRIFUGAL COMPRESSORS

[75] Inventors: Thomas E. Watson; Watson L. Courtney, both of Staunton, Va.

[73] Assignee: Westinghouse Electric Corp., Pittsburgh, Pa.

[21] Appl. No.: 11,987

[22] Filed: Feb. 14, 1979

[51] Int. Cl.³ .......................... F04B 41/06; F25B 7/00
[52] U.S. Cl. ...................................... 62/175; 62/510; 318/98; 417/3
[58] Field of Search ........................ 62/175, 510, 230; 417/3, 44, 45; 361/22; 318/98, 99

[56] References Cited

U.S. PATENT DOCUMENTS

| | | | |
|---|---|---|---|
| 3,162,793 | 12/1964 | Mason | 318/99 X |
| 3,774,092 | 11/1973 | Messervey et al. | 318/99 |
| 4,152,902 | 5/1979 | Lush | 318/98 X |

*Primary Examiner*—William E. Wayner
*Attorney, Agent, or Firm*—E. C. Arenz

[57] ABSTRACT

An improved load balancing control circuit for at least three electric motor-driven centrifugal refrigerant compressors comprises a current transformer secondary 90', 91', 92' and a respective load resistor 93', 95', 97' in series to form the legs of a circuit in which the legs are connected in a delta, each leg having a shorting switch 110', 111', 112' connected across it, and a balancing resistance network including balancing resistors 94', 96', 98' are connected in a wye circuit with the delta circuit.

3 Claims, 4 Drawing Figures

4,248,054

REFRIGERATION SYSTEM WITH LOAD BALANCING CONTROL FOR AT LEAST THREE CENTRIFUGAL COMPRESSORS

BACKGROUND OF THE INVENTION

1. Field of the Invention

This invention pertains to the art of load balancing control of multiple centrifugal compressors.

2. Description of the Prior Art

U.S. Pat. No. 3,648,479 (assigned to the assignee of this application) discloses a load balancing control arrangement for a multiple centrifugal compressor refrigeration system. Our invention is considered to be an improvement in the specific circuitry of that arrangement in that it will provide improved load balancing in refrigeration systems having at least three compressors.

In that patent, the "Background of the Invention," which is equally applicable here, is expressed as follows:

It is known that an electric motor-driven centrifugal gas compressor is capable of overloading the motor if allowed to seek loads higher than the standard designed conditions. Centrifugal gas compressors, when used to compress a refrigerant gas, are therefore required to have variable capacity controls and one such control determines the positions of movable suction inlet prerotation vanes for the compressor to vary the compressor capacity. An electrical control circuit for automatically positioning such inlet vanes to provide a predetermined control of refrigeration or air conditioning system parameters, such as for example the chilled outlet water temperature, is disclosed in the then pending, now issued, U.S. Pat. No. 3,609,989. As there disclosed, a current sensing coil is also provided to operate an overload relay whenever the current drawn by the electric motor driving the compressor exceeds a predetermined amount corresponding to an overload condition. The operation of the overload relay causes the inlet vanes of the associated compressor to move in a decreased capacity direction until the sensed overload current is reduced to a safe value at which the operated overload relay restores to the nonoperated condition upon which the movement of the inlet vanes toward a decreased capacity position is stopped. It is sometimes desirable to have two or more centrifugal gas compressors connected to the same common refrigerant load circuit and each gas compressor should have its own capacity control circuit corresponding to the common system condition, such as chilled water temperature or the like. A problem exists with such an arrangement in that one of the compressors tends to work harder than the other compressors in the system; and therefore it is desirable to provide a load balancing capacity control to evenly divide the common load among all of the operating compressors. Such a control should be simple, reliable and also inexpensive.

As noted, that expression of the background is equally applicable here.

There are several deficiencies in the specific circuitry illustrated in the noted U.S. Pat. No. 3,648,479. These deficiencies will be taken up in connection with FIGS. 1 and 2 of this application which correspond to the prior art FIGS. 1 and 2 of the noted U.S. Pat. No. 3,648,479.

SUMMARY OF THE INVENTION

In accordance with our invention, the specific improved circuit arrangement for a refrigeration system in which the refrigerant load is served by at least three electric motor-driven centrifugal gas compressors having individual capacity control and load balancing control operated from signals from current transformer secondaries, includes one of the current transformer secondaries associated with a motor line to each motor and a load resistor in series with the secondary to form a leg in the circuit, a shorting switch connected across the secondary and its load resistor, each leg of the circuit being connected to the other legs to form a delta circuit in a three-compressor system and a ring circuit in a four or more compressor system, and a balancing resistance network including a balancing resistance for each leg, the balancing resistances being connected in a wye circuit arrangement with the delta circuit in a three-compressor system and in a star circuit with the ring circuit in a four or more compressor system.

DRAWING DESCRIPTION

Figure 2:
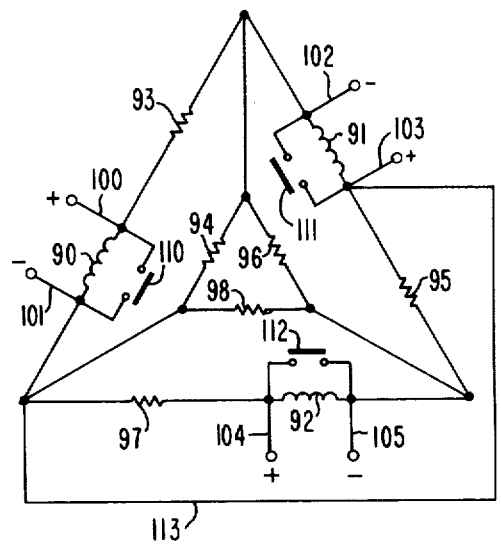
Figure 3:
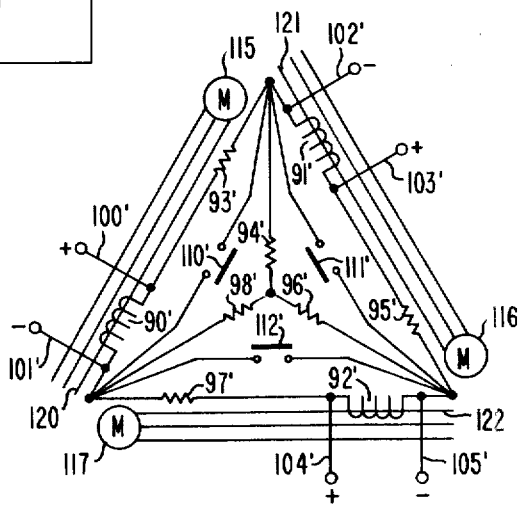
Figure 4:
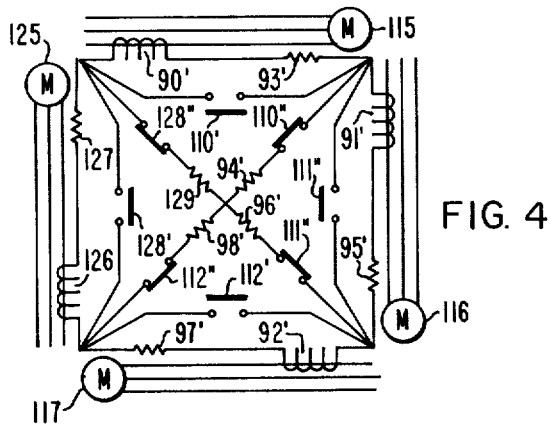

FIG. 1 is a prior art diagrammatic view of the refrigeration system having two compressors and a load balancing circuit precisely as shown in U.S. Pat. No. 3,648,479;

FIG. 2 is a schematic diagram of the load sharing capacity control system disclosed in FIG. 6 of U.S. Pat. No. 3,648,479, but rearranged in configuration to promote the comparison of that circuit with the circuit for a three-compressor load balancing control circuit of the present invention;

FIG. 3 is a circuit diagram of a load sharing capacity control system of this invention for a three-compressor system; and FIG. 4 is a circuit diagram of a load sharing capacity control system of this invention as may be used with a four-compressor system.

DESCRIPTION OF THE PRIOR ART FOR COMPARISON PURPOSES

The refrigeration system of the prior art of FIG. 1 will be only briefly described and reference should be had to U.S. Pat. No. 3,648,479 for a more detailed description of the showing in FIG. 1. The numerals used in FIG. 1 for the elements are the same as those used in the issued patent to facilitate that understanding.

Basically, the system includes a first centrifugal compressor 1 driven by motor 2, a second centrifugal compressor 3 driven by motor 4, a condenser 7 and a chiller 9. For controlling the capacity of the first compressor, there is a chilled water temperature condition sensor and control arrangement 19 and 20 which operates switch 21 to a closed position for a decrease capacity direction and switch 22 for an increase capacity direction, these switches controlling the energization of the capacity solenoid valves 27 (decrease) and 29 (increase). The corresponding elements for the second compressor are 23, 24 for sensing and control, decrease switch 25, increase switch 26, and decrease coil 28 and increase coil 30. Details of how the operation of these switches and coils effects the capacity increase and decrease of the compressors can be had from the noted patent.

The load balancing arrangement of the prior art as shown in FIG. 1 includes the current transformer secondaries 70 and 71 for the two compressors, the load resistors 75 and 77, the balancing resistor 76 and the overload relay coils 72 and 73, which operate switches 72' and 73', respectively, in accordance with the potential across the two current transformer secondaries 70 and 71. When either of these switches 72' or 73' closes, the respective capacity solenoid valve coils 28 and 30 are energized. The arrangement also includes the shorting contacts 80 and 81 operated by the coils 82 and 83, respectively, to a closed position when one or the other of the compressor motors 2 and 4 is not energized so that the system may be operated at times with only one of the compressors operating.

As explained in the patent, the way the load balancing works is that the current transformer coils and resistors are interconnected with the polarities of the coils such as to result in opposing currents flowing through the resistor 76, one current flowing in one direction being the current induced in sensing coil 70 and the other current flowing the opposite direction being the current induced in the sensing coil 71. Then, by suitably choosing the values of the resistors in relation to the parameters of the coils and the overload relays, the associated overload relays 72 or 73 can be caused to be operated when the current drawn by one of the electric motors 2 or 4 appreciably differs from the current drawn by the other electric motor 2 or 4. Thus, should the electric motor 2, for example, draw more current than electric motor 4, indicating that the gas compressor 1 is working at higher relative load than the gas compressor 3, the overload relay 72 would be energized to close its contacts 72' and actuate the decrease capacity solenoid coil 27 to adjust the inlet vanes for the gas compressor 1 in a direction to reduce its capacity until its capacity approximates that of the gas compressor 3. Thus, when the currents flowing through the conductors 15 and 18 to the motors are equal, the opposing currents flowing in the resistor 76 will balance so that there will be no effective potential adding or subtracting to cause a preferential operation of either the overload relays 72 or 73.

Referring to the FIG. 2 prior art showing, the circuit shown corresponds to the circuit in FIG. 6 of the noted prior art patent. However, FIG. 2 in this application is placed in a generally delta configuration; whereas, that of FIG. 6 in the noted patent is shown in a chain configuration. The numerals identifying the elements in FIG. 2 are identical to the numerals used for the same elements in FIG. 6 of the issued patent. The resistors 93, 95 and 97 are the load resistors; while the resistors 94, 96 and 98 are the balancing network resistors. The current transformer secondaries for the first, second and third compressor drive motors are 90, 91 and 92, respectively. The voltages for operating a first, second and third overload relay (not shown in FIG. 2) are picked up from the secondaries by the lines 100–101, 102–103, and 104–105, respectively.

It will be noted that the shorting contactors 110, 111, and 112, are connected in the prior art to short across the secondaries only. It will also be noted in FIG. 2 that there is a line identified as 113 (not identified in the prior art patent FIG. 6), but which makes a connection between the lines 101 and 103.

Referring now to FIGS. 3, the improved circuit arrangement according to the invention for a three-compressor system is shown. The three motors for the three separate compressors are identified by the numerals 115, 116 and 117. The line conductors to the three motors with which the three current transformer secondaries are associated are identified by the numerals 120, 121 and 122. A comparison of the circuitry of FIGS. 2 and 3 should make apparent the differences between that of the invention relative to that of the prior art. First, it will be seen that the shorting contact 110', 111' and 112' are each connected to short out both its respective secondary and load resistor in a leg of the circuitry. Secondly, it will be seen that the balancing resistance network comprising the resistors 94', 96' and 98' are connected in a wye within the delta configuration comprised of the three legs, each of which includes the current transformer secondary and its load resistor in series therewith. Finally, it will be apparent that there is an absence of any conductive line comparable to that identified as 113 in the FIG. 2 prior art circuit.

To ensure an understanding of the operation of the circuit of FIG. 3, the following is noted. As is well known, the voltage developed across any of the current transformer secondaries is primarily dependent upon the impedance of the circuit in which it is wired. If the current flowing in the lines 120, 121 and 122 of the main power leads going to the motors is of identical value, then the currents induced by the current transformers will be of identical value and the voltage across the current transformers will be identical because the circuit impedances are identical. However, if the main power leads to not have identical values of current, then the currents induced by the current transformer secondaries will not be identical in value, and thus currents will circulate through the balancing resistance network comprised of resistors 94', 96' and 98'.

The current transformer secondaries that have ampere values higher than its upstream neighbor will have to develop a higher voltage to pass current through a higher impedance. The voltage across the current transformer secondaries is of course that which is used as a signal to its respective load controller relay. Using 5.0 volts as an example of the voltages across the current transformer secondaries when each of the compressors is operating at a 100% load, then if the voltage exceeds 5.0 volts, an unload signal is given to the respective overload relay.

The following table illustrates how the control operates with three loads. Whenever the voltage across a current transformer exceeds 5.0 volts, an unload signal is sent to the corresponding overload relay which will decrease capacity to cause the system to move toward a balanced condition.

| PERCENT LOAD CURRENT | | | VOLTAGE ACROSS SECONDARY | | |
|---|---|---|---|---|---|
| Load 1 | Load 2 | Load 3 | 90' | 91' | 92' |
| 100 | 100 | 100 | 5.0 | 5.0 | 5.0 |
| 80 | 100 | 100 | 3.1 | 5.9 | 5.9 |
| 60 | 100 | 100 | 1.3 | 6.3 | 6.3 |
| 60 | 60 | 100 | 2.1 | 2.1 | 7.2 |
| 80 | 80 | 100 | 3.6 | 3.6 | 6.1 |
| 60 | 80 | 100 | 1.7 | 4.2 | 6.5 |
| 80 | 80 | 80 | 4.0 | 4.0 | 4.0 |
| 60 | 60 | 60 | 3.0 | 3.0 | 3.0 |
| 40 | 40 | 40 | 2.0 | 2.0 | 2.0 |

Referring now to FIG. 4, a circuit arrangement useful for four loads is illustrated. The numerals for those elements of the circuit of FIG. 4 which correspond with those of FIG. 3 are identical in FIG. 4. Thus, it will be seen that there is an additional leg in the circuit to serve the motor 125, the additional leg including the current transformer secondary 126 in series with the load resistor 127, all of the legs comprising a secondary and load resistor being connected to each other to form a ring circuit. The four load circuit also requires the addition of a shorting contactor 128 which bridges the leg including the secondary 126 and resistor 127. The balancing resistances including the additional one identified at 129 are arranged in a star circuit within the leg, with each of the legs of the star also including an additional auxiliary switch which has a position opposite to that of its counterpart auxiliary switch. These additional auxiliary switches are 110", 111", 112" and 128". When all four compressors are being operated at once, the double prime contact indicated switches will be closed, while the single prime indicated switches will be open. For any compressor not operating at a given time, the single prime indicated switch will be closed to a shorting position and the corresponding double prime indicated switch will open to take its resistor out of the circuit. In all other respects, the way in which the four-compressor system operates is the same as that of the three-compressor system of FIG. 3.

What is claimed is:

1. In a refrigerant system in which a refrigerant load is served by at least four electric motor-driven centrifugal gas compressors which have individually movable capacity control means controlled to operate in a decrease capacity direction by voltage signals above a given level derived from current transformer secondaries responsive to electric motor current in lines to the respective compressors, to thus balance the loads on the compressors, an improved circuit arrangement comprising:

one of said current transformer secondaries associated with a line to each said motor and a load resistor in series with said secondary to form a leg of a circuit;

a shorting switch connected across each secondary and its said load resistor;

each said leg of the circuit being connected to the other legs to form a ring circuit in a four or more compressor system;

a balancing resistance network including a balancing resistance for each leg, said balancing resistances being connected in a star circuit with said ring circuit in a four or more compressor system.

2. In a refrigerant system as specified in claim 1 which includes four electric motor-driven centrifugal gas compressors and in which the balancing resistance network has a star circuit configuration within a ring circuit, wherein:

each leg of said star includes switch means having a reverse condition relative to the position of its counterpart shorting switch.

3. In a refrigerant system in which a refrigerant load is served by three electric motor-driven centrifugal gas compressors which have individually movable capacity control means controlled to operate in a decrease capacity direction by voltage signals above a given level derived from current transformer secondaries responsive to electric motor current in lines to the respective compressors, to thus balance the loads on the compressors, an improved circuit arrangement comprising:

one of said current transformer secondaries associated with a line to each said motor and a load resistor in series with said secondary to form a leg of a circuit;

a shorting switch connected across each secondary and its said load resistor;

each said leg of the circuit being connected to the other legs to form a delta circuit in a three-compressor system;

a balancing resistance network including a balancing resistance for each leg, said balancing resistances being connected in a wye circuit arrangement with said delta circuit in a three-compressor system.

* * * * *